Patented June 21, 1927.

1,633,462

UNITED STATES PATENT OFFICE.

HAROLD H. SORTWELL, OF TRENTON, NEW JERSEY, ASSIGNOR TO THE STAR PORCELAIN COMPANY, OF TRENTON, NEW JERSEY, A CORPORATION OF NEW JERSEY.

CERAMIC INSULATING MATERIAL.

No Drawing.  Application filed February 27, 1924. Serial No. 695,576.

My invention relates to ceramic material and more particularly to insulating material of the porcelain type. One object of my invention is the economic production of black insulating porcelain of good quality. My material gives insulators which are vitreous, yet mechanically strong and which resist abrasion, and are non-inflammable, and of high dielectric strength. It provides a black porcelain which can be used in place of any hot or cold moulded composition insulation.

The material is made by the addition of certain coloring ingredients to a base or group of porcelain-forming ingredients. These coloring ingredients are preferably mixtures of the oxides of chromium, cobalt, iron and manganese, and the chromate of iron, and iron ores high in the magnetic oxide of iron, and red burning clays. The mixtures may be calcined and fired at temperatures suitable for insulating porcelain before being mixed with the porcelain-forming ingredients.

As porcelain-forming ingredients, I employ feldspar, flint and one or more kinds of clay—such as red burning clay, English China clay, kaolin, and ball clay. The coloring ingredients and the porcelain-forming ingredients are ground wet in a ball mill, filterpressed, dried, pulverized and formed by the usual dry press process and fired in the usual way. The following are three examples of mixtures of the coloring and porcelain-forming ingredients which form black porcelain compositions of the desired qualities:

| | Parts. |
|---|---|
| Black iron ore | 45 |
| Red burning clay | 35 |
| Potters flint | 15 |
| Feldspar | 5 |

| | Parts. |
|---|---|
| Red oxide of iron | 6 |
| Chromate of iron | 5 |
| Cobalt oxide | 5 |
| Ball clay | 17 |
| Fla. kaolin | 6 |
| English China clay | 20 |
| Feldspar | 16 |
| Flint | 25 |

| | Parts. |
|---|---|
| Red oxide of iron | 7½ |
| Cobalt oxide | 5 |
| Feldspar | 19½ |
| Potters flint | 25 |
| English China clay | 23 |
| Ball clay | 20 |

I apply to the surface of this black body, a black vitreous covering which may be either an engobe (slip) or glaze by spraying just before the ware is fired. As an example of a suitable engobe I give the following:

| | Parts. |
|---|---|
| Red oxide of iron | 9 |
| Cobalt oxide | 5 |
| Feldspar | 16 |
| Potters flint | 25 |
| English China clay | 25 |
| Ball clay | 20 |

As an example of a suitable glaze I give the following:

| | Parts. |
|---|---|
| Manganese oxide | 2 |
| Cobalt oxide | 1.3 |
| Chromium oxide | 1 |
| Iron oxide | 2 |
| Feldspar | 40 |
| Whiting | 16 |
| China clay | 25 |
| Potters flint | 19 |

What I claim is:

Black porcelain insulating material containing 45 parts of black iron ore, 35 parts of red burning clay, 15 parts of potter's flint and 5 parts of feldspar.

In testimony whereof I have signed my name to this specification.

HAROLD H. SORTWELL.